US009178254B2

(12) United States Patent
Lee et al.

(10) Patent No.: US 9,178,254 B2
(45) Date of Patent: Nov. 3, 2015

(54) LITHIUM AIR BATTERY

(75) Inventors: Dong-joon Lee, Seoul (KR); Victor Roev, Suwon-si (KR); Young-gyoon Ryu, Suwon-si (KR); Dong-min Im, Seoul (KR); Yasuo Takeda, Tsu (JP); Osamu Yamamoto, Tsu (JP); Nobuyuki Imanishi, Tsu (JP)

(73) Assignees: SAMSUNG ELECTRONICS CO., LTD. (KR); NATIONAL UNIVERSITY CORPORATION MIE UNIVERSITY (JP)

( * ) Notice: Subject to any disclaimer, the term of this patent is extended or adjusted under 35 U.S.C. 154(b) by 127 days.

(21) Appl. No.: 13/311,726

(22) Filed: Dec. 6, 2011

(65) Prior Publication Data

US 2012/0141889 A1    Jun. 7, 2012

(30) Foreign Application Priority Data

Dec. 7, 2010 (KR) .................. 10-2010-0124232

(51) Int. Cl.
*H01M 10/052* (2010.01)
*H01M 12/06* (2006.01)

(52) U.S. Cl.
CPC ...... *H01M 12/06* (2013.01); *H01M 2300/0025* (2013.01)

(58) Field of Classification Search
CPC .......... H01M 10/052; H01M 2300/00; H01M 2300/0017
USPC ........... 429/405, 306–343; 252/62.2; 423/472
See application file for complete search history.

(56) References Cited

U.S. PATENT DOCUMENTS

| | | | |
|---|---|---|---|
| 4,609,600 A | 9/1986 | Heinze et al. | |
| 4,857,423 A * | 8/1989 | Abraham et al. | 429/329 |
| 6,783,896 B2 * | 8/2004 | Tsujioka et al. | 429/306 |
| 7,344,804 B2 * | 3/2008 | Klaassen | 429/247 |
| 2002/0081496 A1 * | 6/2002 | Tsujioka et al. | 429/307 |
| 2009/0081557 A1 * | 3/2009 | Chen et al. | 429/337 |
| 2010/0040954 A1 * | 2/2010 | Amine et al. | 429/322 |
| 2010/0266907 A1 * | 10/2010 | Yazami | 429/405 |
| 2010/0273066 A1 * | 10/2010 | Flanagan et al. | 429/338 |
| 2011/0171112 A1 * | 7/2011 | Armand et al. | 423/472 |
| 2011/0195283 A1 | 8/2011 | Sun et al. | |

FOREIGN PATENT DOCUMENTS

| | | |
|---|---|---|
| DE | 28 52 161 | 6/1980 |
| EP | 0 158 047 | 10/1985 |
| EP | 2 355 223 | 8/2011 |
| JP | 62-201968 | 9/1987 |
| JP | 2002298934 A | 10/2002 |

(Continued)

OTHER PUBLICATIONS

Oyaizu et al. Electroreduction of oxygen enriched in a [poly(ethyleneiminato)]cobalt(II) layer J. Mater. Chem., 2002,12, 3162-3166.*

(Continued)

*Primary Examiner* — Stewart Fraser
*Assistant Examiner* — Olatunji Godo
(74) *Attorney, Agent, or Firm* — Cantor Colburn LLP

(57) ABSTRACT

A lithium air battery including: a negative electrode including lithium; a positive electrode using oxygen as a positive active material; and an organic electrolyte, wherein the organic electrolyte includes a metal-ligand complex.

26 Claims, 1 Drawing Sheet

(56) References Cited

FOREIGN PATENT DOCUMENTS

| | | |
|---|---|---|
| JP | 2008-300179 | 12/2008 |
| JP | 2009-245828 | 10/2009 |
| JP | 201215016 A | 1/2012 |
| JP | 2013527567 A | 6/2013 |
| KR | 10-2011-0089079 | 8/2011 |
| WO | WO 2007/111895 | 10/2007 |
| WO | WO 2007/144633 | 12/2007 |
| WO | WO 2009/122044 * | 10/2009 |
| WO | WO 2011/057769 | 5/2011 |

OTHER PUBLICATIONS

Beer et al. (Coordination Chemistry Reviews 205 (2000) 131-155, Fig. 1 p. 133).*

Golovin et al. (J. Electrochem. Soc., vol. 139, No. 1, Jan. 1992).*

Débart, Paterson, Bao, and Bruce α-$MnO_2$ Nanowires: A Catalyst for the $O_2$ Electrode in Rechargeable Lithium Batteries Angew. Chem. Int. Ed. 2008, 47, 4521-4524.

Cheng and Scott Carbon-supported manganese oxide nanocatalysts for rechargeable lithium-air batteries Journal of Power Sources 195 (2010) 1370-1374.

Lu, Xu, Gasteiger, Chen, Hamad-Schifferli, and Shao-Horn Platinum-Gold Nanoparticles: A Highly Active Bifunctional Electrocatalyst for Rechargeable Lithium-Air Batteries J. Am. Chem. Soc. 2010, 132, 12170-12171.

Butler and Harrod Inorganic Chemistry The Benjamin/Cumming Publishing Company, Inc., 1989, Title and 362-439.

EP Search Report dated Feb. 28, 2012, issued in corresponding European Application No. 11192185.4-2119.

Hardwick, et al., Beyond Intercalation towards the Lithium-Air Battery', 216th ECS Meeting, Abstract #685, The Electrochemical Society, p. 1, Downloaded on Jul. 24, 2013 to IP 202.20.193.254 address. Redistribution subject to ECS license or copyright; see ecsdl.org/site/terms_use.

English Translation of Office Action issued by the Japanese Patent Office dated Mar. 9, 2015.

M. Neal Golovin, et al., "Applications of Metallocenes in Rechargeable Lithium Batteries for Overcharge Protection" J. Electrochem. Soc. 1992, 139 (1), pp. 5-9.

* cited by examiner

LITHIUM AIR BATTERY

CROSS-REFERENCE TO RELATED APPLICATIONS

This application claims the benefit of Korean Patent Application No. 10-2010-0124232, filed on Dec. 7, 2010 in the Korean Intellectual Property Office, the disclosure of which is incorporated herein by reference.

BACKGROUND

1. Field

Aspects of the present invention relate to lithium air batteries.

2. Description of the Related Art

A lithium air battery generally includes a negative electrode capable of intercalating and deintercalating lithium ions, a positive electrode that oxidizes and reduces oxygen present in the air, and an electrolyte disposed between the negative and positive electrodes.

Since use of a lithium positive electrode makes it unnecessary to store air within a positive active material, the lithium air battery may have high capacity. Lithium air batteries have a high theoretical energy density per unit weight of 3500 Wh/kg or greater, which are about ten times higher than that of lithium ion batteries. However, because of polarization by a high overvoltage during charging and discharging, existing lithium air batteries have considerably low energy efficiency compared to lithium ion batteries.

To lower the charge-discharge overvoltage, various kinds of catalysts have been used; however, their effect has not been sufficient. Therefore, there is a demand for methods to further reduce the charge-discharge overvoltage for obtaining higher charge-discharge energy efficiency.

SUMMARY

Aspects of the present invention provide lithium air batteries with markedly improved energy efficiencies as a result of reduced charge-discharge overvoltages.

According to an aspect of the present invention, a lithium air battery includes: a negative electrode including lithium; a positive electrode using oxygen as a positive active material; and an organic electrolyte, wherein the organic electrolyte includes a metal-ligand complex.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
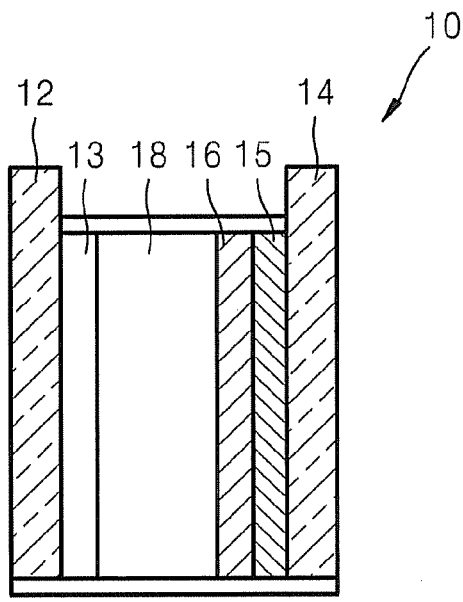
FIG. 1 is a schematic view illustrating the structure of a lithium air battery according to an embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Embodiments of lithium air batteries according to the present invention will be described below in greater detail. According to an aspect of the present invention, a lithium air battery includes a negative electrode containing lithium, a positive electrode using oxygen as a positive active material, and an organic electrolyte, wherein the organic electrolyte may include a metal-ligand complex.

A typical lithium air battery may use either an aqueous electrolyte or an organic electrolyte. Reaction mechanisms of a lithium air battery using an organic electrolyte may be given by reaction scheme 1 below.

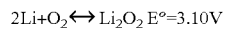 Reaction Scheme 1

During discharging, lithium from the negative electrode reacts with oxygen from the positive electrode and lithium oxide is formed as a result of oxygen reduction ("oxygen reduction reaction (ORR)"). Conversely, during charging, the lithium oxide is reduced due to oxygen generation ("oxygen evolution reaction (OER)").

During discharging, $Li_2O_2$ is deposited in pores of the positive electrode, and the amount of the deposited $Li_2O_2$ determines the capacity of the lithium air battery. However, the deposited $Li_2O_2$ is difficult to oxidize during charging. Accordingly, during charging, an overvoltage is applied to facilitate oxidation of the $Li_2O_2$. Generally, a catalytic material is added into the positive electrode to lower the overvoltage.

Unlike such a typical lithium air battery, according to an embodiment of the present invention, by adding a metal-ligand complex to the electrolyte of the lithium air battery, the capacity of the lithium air battery may be increased, and a charge/discharge voltage polarization (=charge voltage–discharge voltage) may be reduced.

The metal-ligand complex in the organic electrolyte takes part in the electrode reactions over a larger area, thereby inducing additional reactions at the interfaces of the metal-ligand complex with the electrodes and the $Li_2O_2$. As the interfacial characteristics vary, the interfacial resistance changes. In contrast with typical lithium air batteries, in a lithium air battery of an embodiment of the present invention, an electrode reaction rate is remarkably increased, the electrode reaction becomes reversible, and a markedly lower overvoltage during charging and discharging is sufficient.

The term "metal-ligand complex" as used herein means any compound known in the art that is involved in electron transfer during charging and discharging and forms a complex by binding of a metal and a ligand. The metal-ligand complex may also be referred to as a coordination complex, a metal complex, or a complex compound with a core metal atom. Examples of the metal-ligand complex include any complex with a core metal atom as defined in the book "Inorganic Chemistry" (Ian S. Butler & John F. Harrod, The Benjamin/Cumming Publishing Company, Inc., 1989, pp. 359-439).

The metal-ligand complex and the organic electrolyte including the metal-ligand complex may serve as mediators fully or partially responsible for electron transfer between the positive electrode and "lithium oxide" during charging and/or discharging processes. As used herein, the term "lithium oxide" refers to any kind of lithium oxide, including the specific compound, $Li_2O$, lithium peroxide, $Li_2O_2$, or the like.

The metal-ligand complex may have a redox potential of about 2 V to about 5 V with respect to lithium metal, which falls within the charge/discharge voltage range of a lithium air battery. That is, the metal-ligand complex may be oxidized or reduced during charging and discharging of the lithium air battery. Regardless of the chemical structure, any metal-ligand complex having a redox potential within the charge-discharge voltage range of lithium air batteries, for example, a redox potential of about 2 V to about 5 V with respect to lithium metal, and being able to remain stable in the organic electrolyte may be used as the metal-ligand complex.

Hereinafter, an exemplary mechanism of the metal-ligand complex and the organic electrolyte including the metal-ligand complex in electron transfer during charging and discharging will now be described in detail. The description is for illustrative purposes only and is not intended to limit the scope of the present invention.

During charging of the lithium air battery, first, the metal-ligand complex is oxidized by transferring electrons to the positive electrode at a lower voltage compared to lithium oxide. Then, the oxidized metal-ligand complex accepts electrons from the lithium oxide adhered to a surface of the positive electrode, and thus, is reduced back to the original metal-ligand complex. Having transferred electrons to the oxidized metal-ligand complex, the lithium oxide loses oxygen and is oxidized to lithium ions, which are dissolved in the organic electrolyte. The reduced metal-ligand complex transfers electrons to the positive electrode, thereby being oxidized again.

The metal-ligand complex may transfer electrons by forming redox couples during charging and/or discharging. That is, while repeatedly shifting between oxidized and reduced forms, the metal-ligand complex participates in the electron transfer in the electrode reactions.

The metal of the metal-ligand complex may include at least one selected from the metals of Groups 3 to 15 in the periodic table of elements. For example, the metal may include a transition metal. The metal may be at least one metal selected from the group consisting of titanium (Ti), vanadium (V), chromium (Cr), manganese (Mn), iron (Fe), cobalt (Co), nickel (Ni), copper (Cu), niobium (Nb), molybdenum (Mo), ruthenium (Ru), tin (Sn), antimony (Sb), tungsten (W), platinum (Pt), silver (Ag), gold (Au), palladium (Pd), rhodium (Rh), and lead (Pb).

The ligand of the metal-ligand complex may include a double bond and/or a triple bond in its molecule. Examples of the double bond include carbon-carbon double bonds, carbon-oxygen double bonds, and nitrogen-nitrogen double bonds. The triple bond may be a carbon-nitrogen triple bond. However, any double or triple bond known in the art is available without particular limitations.

The ligand of the metal-ligand complex may include at least one selected from the group consisting of a straight or branched aliphatic chain, an alphatic ring, a straight or branched heteroaliphatic chain, a heteroaliphatic ring, a aromatic ring and a heteroaromatic ring.

The ligand may include a conjugated system. A conjugated system refers to a system of connected p-orbitals in compounds with alternating single and double bonds. A conjugated system may also include delocalized π-electrons. Delocalized π-electrons stabilize a compound with a conjugated system. Therefore, a complex including a ligand with a conjugated system may be maintained stable during oxidation and/or reduction. Example of a conjugated system include 1,3-butadiene, 1,3,5-heptatriene, benzene, cyclopentadiene, and cycloheptatriene.

The ligand may include a haptic ligand, and a polydentate ligand with at least two coordination sites. Hapticity of ligands refers to the situation where multiple carbon atoms from the ligand coordinate equally to a central metal atom. Examples of a haptic ligand include η3-allyl, η3-allenyl, η2-butadiene, η4-butadiene, η1-cyclopentadiene, η3-cyclopentadiene, η5-cyclopentadiene, η2-benzene, 0-benzene, η6-benzene, η7-cycloheptatriene, η8-cyclooctatriene, and the like.

A polydentate ligand refers to ligands with multiple coordination sites that are coordinated to a central metal atom. Examples of a polydentate ligand include ethylenediamine, 2,2'-bipyridine, 1,10-phenanthroline, acetylacetonate, 1,1-bis(diphenylphosphino)ethane, 1,2-bis(diphenylphosphino)ethane, crown ether, cryptate, diethylenetriamine, dimethylglyoxime, ethylenediaminetetraacetate, ethylenediaminetriacetate, glycinate, heme, triethylenetetraamine, terpyridine, and the like.

The ligand may include a $C_5$-$C_{50}$ aliphatic ring, a $C_2$-$C_{50}$ heteroaliphatic ring, a $C_5$-$C_{50}$ aromatic ring, or a $C_2$-$C_{50}$ heteroaromatic ring. These aromatic and heteroaromatic rings may include at least two aromatic rings fused to each other.

In some embodiments, the ligand may include at least one selected from the group consisting of a phthalocyanine ring, a porphyrin ring, a cyclopentadiene ring, an indene ring, a pyridine ring, a carbazole ring, an imidazole ring, a pyrrole ring, a thiophene ring, a thianthrene ring, a furan ring, a pyran ring, an isobenzofuran ring, a pyrazole ring, an isothiazole ring, an isoxazole ring, a pyrazine ring, a pyrimidine ring, a pyridazine ring, a pyrrolizine ring, an indolizine ring, an isoindole ring, an indole ring, an indazole ring, a purine ring, a quinolizine ring, an isoquinoline ring, a quinoline ring, a phthalazine ring, a naphthyridin ring, a quinoxaline ring, a quinazoline ring, a cinnoline ring, a pteridine ring, a phenanthridine ring, an acridine ring, a perimidine ring, a phenanthroline ring, a phenazine ring, a phenothiazine ring, a phenoxazine ring, and derivatives thereof.

The ligand may include at least one heteroatom selected from the group consisting of fluorine (F), chlorine (Cl), bromine (Br), iodine (I), silicon (Si), nitrogen (N), oxygen (O), sulfur (S), phosphorus (P), boron (B), selenium (Se), tellurium (Te), and arsenic (As). The ligand may be a single atom, or a ligand with at least two heteroatoms. Examples of the ligand include acetate, acetylacetonate, halide, nitrite, and the like.

In some embodiments, the ligand may include at least one selected from the group consisting of benzene, cyclopentadiene, acetylacetonate, pyridine, bipyridine, triphenylphosphine, diethylenetriamine, ethylenediamine, ethylenediaminetetraacetate (EDTA), ethylenediaminetriacetate, 1,2-bis(diphenylphosphino)ethane, 1,1-bis(diphenylphosphino)methane, 1,10-phenanthroline, corroles, crown ether, [2,2,2] cryptand, dimethylglyoximate, glycinate, heme, nitrosyl, pyrazine, scorpionate, 2,6-bis(2-pyridyl)pyridine, 1,4,7-triazacyclononane, tricyclohexylphosphine, triethylenetetraamine, trimethylenephosphine, tri(o-tolyl)phosphine, tris(2-aminoethyl)amine, tris(2-diphenylphosphineethyl)amine, tropylium, oxalate, phthalocyanine, porphyrin, I—, Br—, $S^{2-}$, S—CN—, Cl—, $NO^{3-}$, N3-, F—, OH—, $H_2O$, N=C=S—, $CH_3CN$, $NH_3$, $NO_2^-$, CN—, C=O, $(SO_3)^{2-}$, and derivatives thereof.

The organic electrolyte may include at least one complex selected from the group consisting of a metallocene complex bearing a transition metal and at least one haptic cyclopentadiene ligand; a phthalocyanine complex bearing a transition metal and a phthalocyanine ligand; a porphyrin complex bearing a transition metal and a porphyrin ligand; an amine complex bearing a transition metal and an amine ligand; a phosphine complex bearing a transition metal and a phosphine ligand; a pyridine complex bearing a transition metal and a pyridine ligand; a phenanthroline complex bearing a transition metal and a phenanthroline ligand; an acetylacetonate complex bearing a transition metal and an acetylacetonate ligand; an acetate complex bearing a transition metal and an acetate ligand, and derivatives of these complexes.

Examples of the metallocene complex are represented by Formula 1 below.

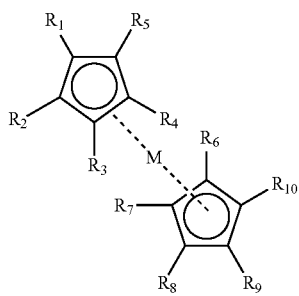

Formula 1

In Formula 1, M is a transition metal (for example, Fe, Co, Ni, Cu and the like), and $R_1$ to $R_{10}$, which are identical to or different from each other, may be each independently selected from the group consisting of a hydrogen atom, a nitro group, an amino group, a hydroxyl group, a halogen atom, a cyano group, a carboxylic group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_2$-$C_{20}$ alkoxycarbonyl group, a substituted or unsubstituted $C_6$-$C_{30}$ aryl group, a substituted or unsubstituted $C_1$-$C_{20}$ heteroalkyl group, a substituted or unsubstituted $C_3$-$C_{20}$ heteroaryl group, a substituted or unsubstituted $C_2$-$C_{20}$ alkylcarbonyl group, a substituted or unsubstituted $C_7$-$C_{30}$ arylcarbonyl group, and a substituted or unsubstituted $C_4$-$C_{30}$ heteroarylcarbonyl group.

Substituents of these alkyl, alkenyl, alkynyl, alkoxy, alkoxycarbonyl, aryl, heteroalkyl, heteroaryl, alkylcarbonyl, arylcarbonyl, and heteroarylcarbonyl groups may include at least one substituent selected from the group consisting of —F; —Cl; —Br; —CN; —NO$_2$; —OH; an unsubstituted $C_1$-$C_{60}$ alkyl group or a $C_1$-$C_{60}$ alkyl group substituted with —F, —Cl, —Br, —CN, —NO$_2$ or —OH; an unsubstituted $C_5$-$C_{60}$ cycloalkyl group or a $C_5$-$C_{60}$ cycloalkyl group substituted with a $C_1$-$C_{60}$ alkyl group, —F, —Cl, —Br, —CN, —NO$_2$ or —OH; an unsubstituted $C_2$-$C_{60}$ heterocycloalkyl group or a $C_r$-$C_{60}$ heterocycloalkyl group substituted with a $C_1$-$C_{60}$ alkyl group, —F, —Cl, —Br, —CN, —NO$_2$ or —OH; an unsubstituted $C_5$-$C_{60}$ aryl group or a $C_5$-$C_{60}$ aryl group substituted with a $C_1$-$C_{60}$ alkyl group, —F, —Cl, —Br, —CN, —NO$_2$ or —OH; and a unsubstituted $C_2$-$C_{60}$ heteroaryl group or a $C_2$-$C_{60}$ heteroaryl group substituted with a $C_1$-$C_{60}$ alkyl group, —F, —Cl, —Br, —CN, —NO$_2$ or —OH.

Examples of the phthalocyanine complex include Fe-phthalocyanine, Cu-phthalocyanine, Co-phthalocyanine, Sn-phthalocyanine, Pb-phthalocyanine, Pd-phthalocyanine, Ag-phthalocyanine, Ni-phthalocyanine, Pt-phthalocyanine, Au-phthalocyanine, and the like.

Examples of the porphyrin complex include Fe-porphyrin, Cu-porphyrin, Co-porphyrin, Sn-porphyrin, Pb-porphyrin, Pd-porphyrin, Ag-porphyrin, Ni-porphyrin, Pt-porphyrin, Au-porphyrin, and the like.

Examples of the amine complex include Fe(EDTA), Co(EDTA), Cu(EDTA), tris(ethylenediamine)Co($^{+3}$)Cl$_3$, and the like.

Examples of the phosphine complex include NiCl$_2$(triphenylphosphine)$_2$, PdCl$_2$(triphenylphosphine)$_2$, [(triphenylphosphine)CuH]$_6$, [PdCl$_2$(1,2-bis(diphenylphosphino)ethane)], and the like.

Examples of the pyridine complex include [Co(bipyridine)$_3$][BF$_4$]$_2$, Pd(bipyridine)Cl$_2$, Pd(bipyridine)(BF$_4$)$_2$, Ru(bipyridine)$_2$Cl$_2$, Fe(bipyridine)$_3$(BF$_4$)$_2$, Fe(bipyridine)$_3$Cl$_2$, Fe(bipyridine)$_3$(PF$_6$)$_2$, and the like.

Examples of the phenanthroline complex include Cu(phenanthroline)$_2$(BF$_4$)$_2$, Cu(phenanthroline)$_2$(Cl)$_2$, Pd(phenanthroline)$_2$(BF$_4$)$_2$, Pd(phenanthroline)$_2$(Cl)$_2$, Ru(phenanthroline)$_3$(BF$_4$)$_2$, Fe(phenanthroline)]$_2$(BF$_4$)$_2$, Mn(phenanthroline)$_2$(BF$_4$)$_2$, Co(phenanthroline)$_2$(BF$_4$)$_2$, Pt(phenanthroline)$_2$(BF$_4$)$_2$, Ag(phenanthroline)(BF$_4$), and the like.

Examples of the acetylacetonate complex include V(acetylacetonate)$_3$, Cu(acetylacetonate)$_2$, Cr(acetylacetonate)$_3$, Mn(acetylacetonate)$_3$, [Ni(acetylacetonate)$_2$]$_3$, Fe(acetylacetonate)$_2$, Co(acetylacetonate)$_2$, Pb(acetylacetonate)$_2$, Pd(acetylacetonate)$_2$, Pt(acetylacetonate)$_2$, Ag(acetylacetonate), Rh(acetylacetonate)$_3$, Ru(acetylacetonate)$_2$, Sc(acetylacetonate)$_3$, and the like.

Examples of the acetate complex include [Mo$_2$(O$_2$CCH$_3$)$_4$], Co(acetate)$_2$, Co(acetate)$_3$, Cu(acetate), Cu(acetate)$_2$, In(acetate)$_3$, Fe(acetate)$_3$, Fe(acetate)$_2$, Pb(acetate)$_2$, Mn(acetate)$_2$, Ni(acetate)$_3$, Pd(acetate)$_2$, Sc(acetate)$_3$, Sn(acetate)$_4$, and the like.

The term "derivatives" refers to the above-listed aromatic ring compounds or heteroaromatic ring compounds to which at least one substituent is linked. Examples of the substituent include —F; —Cl; —Br; —CN; —NO$_2$; —OH; an unsubstituted $C_1$-$C_{60}$ alkyl group and a $C_1$-$C_{60}$ alkyl group substituted with —F, —Cl, —Br, —CN, —NO$_2$ or —OH; an unsubstituted $C_5$-$C_{60}$ cycloalkyl group or a $C_5$-$C_{60}$ cycloalkyl group substituted with —F, —Cl, —Br, —CN, —NO$_2$, or —OH; an unsubstituted $C_2$-$C_{60}$ heterocycloalkyl group or a $C_2$-$C_{60}$ heterocycloalkyl substituted with —F, —Cl, —Br, —CN, —NO$_2$ or —OH; an unsubstituted $C_5$-$C_{60}$ aryl group or a $C_5$-$C_{60}$ aryl group substituted with a $C_1$-$C_{60}$ alkyl group, —F, —Cl, —Br, —CN, —NO$_2$ or —OH; and an unsubstituted $C_2$-$C_{60}$ heteroaryl group or a $C_2$-$C_{60}$ heteroaryl group substituted with —F, —Cl, —Br, —CN, —NO$_2$ or —OH.

The aryl group is a monovalent aromatic ring system including at least two rings, which may be attached to each other or fused with each other. The heteroaryl group indicates an aryl group, at least one carbon atom of which is substituted with at least one atom selected from the group consisting of N, O, S and P. The cycloalkyl group is an alkyl group having an aliphatic ring, and the heterocycloalkyl group is a cycloalkyl group, at least one carbon atom of which is substituted with at least one atom selected from the group consisting of N, O, S and P. The fused aromatic ring or fused heteroaromatic ring, fused to the base ring, may include at least two aromatic ring systems, which may be attached to each other or fused with each other. The fused heteroaromatic ring indicates a fused aromatic ring, at least one carbon atom of which is substituted with at least one atom selected from the group consisting of N, O, S and P.

In the organic electrolyte the amount of the metal-ligand complex may be from about 0.01 mM to about 5 M, and in some embodiments, may be from about 0.1 mM to about 0.5 M. The amount of the metal-ligand complex is not particularly limited as long as the organic electrolyte may effectively transfer electrons during charging and discharging.

The organic electrolyte of the lithium air battery may include an aprotic solvent. Examples of the aprotic solvent include carbonates, esters, ethers, ketones, and alcohols. Examples of the carbonate-based solvents include dimethyl carbonate (DMC), diethyl carbonate (DEC), ethyl methyl carbonate (methyl ethyl carbonate, MEC or EMC), dipropyl carbonate (DPC), methylpropyl carbonate (MPC), ethylpropyl carbonate (EPC), ethylene carbonate (EC), propylene carbonate (PC), and butylene carbonate (BC). Examples of the ester-based solvents include methyl acetate, ethyl acetate, n-propyl acetate, tert-butyl acetate, methyl propionate, ethyl propionate, γ-butyrolactone, 4-decanolide, 5-decanolide, γ-valerolactone, δ-valerolactone, dl-mevalonolactone, γ-caprolactone, δ-caprolactone and ε-caprolactone. Examples of the ether-based solvents include dibutyl ether, tetraglyme, diglyme, dimethoxyethane, 2-methyltetrahydrofuran, and tetrahydrofuran. An example of the ketone-based solvents may be cyclohexanone. Examples of the alcohol-based solvents include ethyl alcohol and isopropyl alcohol. However, any appropriate aprotic solvent available in the art may be used without limitation.

Examples of the aprotic solvent include nitriles (such as R—CN, wherein R is a $C_2$-$C_{20}$ linear, branched, or cyclic hydrocarbon-based moiety that may include a double-bonded aromatic ring or an ether bond), amides (such as dimethylformamide), dioxolanes (such as 1,3-dioxolane), and sulfolanes.

The aprotic solvent may be used alone or in a combination of at least two. In the latter, a mixing ratio of the at least two aprotic solvents may be appropriately adjusted depending on the desired performance of the battery and which can be determined by one of ordinary skill in the art.

The organic electrolyte may include an ionic liquid. Examples of the ionic liquid include linear or branched, substituted compounds containing cations of such as ammonium, imidazolium, pyrrolidinium, and piperidinium, and anions such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$.

The organic electrolyte may include at least one of an alkali metal salt and/or an alkali earth metal salt. The alkali metal salts and/or the alkali earth metal salts, dissolved in an organic solvent, may be used as sources of alkali metal ions and alkali earth metal ions in the battery. The salts may facilitate migration of the alkali metal ions and/or alkali earth metal ions between the positive and negative electrodes. For example, cations of the alkali metal salt and/or alkali earth metal salt may include lithium ions, sodium ions, magnesium ions, potassium ions, calcium ions, rubidium ions, strontium ions, cesium ions, barium ions, and the like.

Anions of the alkali metal salt and/or alkali earth metal salt in the organic electrolyte may include at least one anion selected from the group consisting of $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (wherein x is a natural number), $(C_xF_{2x+1}SO_2)(C_yF_{2y+1}SO_2)N^-$ (wherein x and y are natural numbers), and a halide.

The alkali metal salt and/or the alkali earth metal salt may include, but is not limited to, at least one salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiF, LiBr, LiCl, LiI, and $LiB(C_2O_4)_2$ (LiBOB; lithium bis(oxalato)borate). Any appropriate alkali metal and/or alkali earth metal salts available in the art may be used.

In the organic electrolyte, the amount of the alkali metal salt and/or the alkali earth metal salt may be from about 100 mM to about 10 M, and in some embodiments, may be from about 500 mM to about 2 M. The amount of the salt is not particularly limited, as long as the organic electrolyte may effectively transfer electrons during charging and discharging.

In some embodiments the lithium-containing negative electrode of the lithium air battery may include a lithium metal, a lithium metal-based alloy, or a material capable of accepting and releasing lithium. Materials for the negative electrode are not particularly limited to these materials. That is, any materials including Li or capable of accepting and releasing lithium that are available in the art may be used. The negative electrode determines the capacity of the lithium air battery. In this regard, the negative electrode may be a lithium metal. Examples of the lithium-based alloy include alloys with aluminum (Al), tin (Sn), magnesium (Mg), indium (In), calcium (Ca), titanium (Ti), vanadium (V), and combinations thereof.

The positive electrode, using oxygen as a positive active material, may include a conductive material. The conductive material may be porous. Any porous and conductive material may be used as a material of the positive electrode, and in some embodiments, a porous carbonaceous material may be used. Suitable carbonaceous materials include carbon blacks, graphites, graphenes, activated carbons, carbon fibers, and combinations thereof. Metallic conductive materials, including metal fibers and metal meshes, may be used. Metal powders of copper, silver, nickel, aluminum, and the like may be used. Organic conductive materials, including polyphenylene derivatives, may be used. The above-listed conductive materials may be used alone or in a combination.

The positive electrode may further include a catalyst (redox catalyst) that helps oxidation and reduction of oxygen. Examples of the catalyst include, but are not limited to, precious metal-based catalysts, such as platinum (Pt), gold (Au), silver (Ag), palladium (Pd), ruthenium (Ru), rhodium (Rh), and osmium (Os); oxide-based catalysts, such as a manganese oxide, an iron oxide, a cobalt oxide, and a nickel oxide; and organic metal-based catalysts, such as cobalt phthalocyanine. Any appropriate redox catalyst for oxygen available in the art may be used.

The catalyst may be supported on a support. Examples of the support include an oxide, a zeolite, a clay mineral, and carbon. The oxide may include at least one oxide of alumina, silica, zirconium oxide, and titanium dioxide. The oxide may be an oxide combined with at least one metal selected from the group consisting of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon available as the support include, but are not limited to, carbon blacks, such as ketjen black, acetylene black, channel black, and lamp black; graphites, such as natural graphite, artificial graphite, and expanded graphite; activated carbons; and carbon fibers. Any appropriate material available as a support in the art may be used.

The positive electrode may further include a binder. The binder may include a thermoplastic resin or a thermocurable resin. Examples of the binder include, but are not limited to, polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, and an ethylene-acrylic acid copolymer, which may be used alone or in a combination. Any appropriate binder available in the art may be used.

To manufacture the positive electrode, a redox catalyst for oxygen, a conducting agent, and a binder may be mixed, and then may be added to an appropriate solvent to prepare a positive electrode slurry. The positive electrode slurry may be coated and dried on a surface of a current collector, optionally followed by press-molding to improve electrode density, thereby resulting in the positive electrode. The positive electrode may optionally include a lithium oxide. The redox catalyst for oxygen may be optionally omitted.

A porous body in a matrix or mesh form may be used as the current collector to facilitate diffusion of oxygen. A porous metal plate made of, for example, stainless steel, nickel, or aluminum may be used. Materials for the current collector are not particularly limited, and any appropriate material for current collectors available in the art may be used. The current collector may be coated with an anti-oxidant metal or alloy to prevent oxidation.

A separator may be disposed between the positive electrode and the negative electrode. The separator may have any appropriate composition durable in the use environments of the lithium air battery. For example, the separator may be formed of a polymer non-woven fabric, such as a polypropylene non-woven fabric or a polyphenylene sulfide non-woven fabric, a porous olefin-base resin film, for example, including polyethylene or polypropylene, or a combination of at least two of these materials.

A lithium ion conductive solid electrolyte membrane may be additionally disposed between the negative electrode and the organic electrolyte. The lithium ion conductive solid electrolyte membrane may serve as a protective layer preventing water contained in an aqueous electrolyte and foreign substances, such as oxygen, from directly reacting with lithium contained in the negative electrode. The lithium ion conductive solid electrolyte membrane may include an inorganic material, for example, lithium ion conductive glass, lithium-ion conductive crystal (ceramic or glass-ceramic), or a mixture thereof. Any appropriate material available in the art and having lithium ion conductivity and capable of protecting the negative electrode may be used for the lithium ion conductivity solid electrolyte membrane. To attain chemical stability, the lithium ion conductive solid electrolyte membrane may include an oxide.

The lithium ion conductive crystal may be $Li_{1+x+y}(Al, Ga)_x(Ti, Ge)_{2-x}Si_yP_{3-y}O_{12}$ wherein $0 \leq x \leq 1$, and $0 \leq y \leq 1$, and in some embodiments, $0 \leq x \leq 0.4$, and $0 < y \leq 0.6$, and in some other embodiments, $0.1 \leq x \leq 0.3$, and $0.1 < y \leq 0.4$. Examples of the lithium ion conductive glass-ceramic include lithium-aluminum-germanium-phosphate (LAGP), lithium-aluminum-titanium-phosphate (LATP), lithium-aluminum-titanium-silicon-phosphate (LATSP), and the like.

In some embodiments, the lithium ion conductive solid electrolyte membrane may further include a polymer solid electrolyte, in addition to the glass-ceramic. The polymer solid electrolyte may be polyethylene oxide doped with a lithium salt. Examples of the lithium salt include $LiN(SO_2CF_2CF_3)_2$, $LiSF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like.

In some embodiments, the lithium ion conductive solid electrolyte membrane may further include an inorganic solid electrolyte, in addition to the glass-ceramic. Examples of the inorganic solid electrolyte include $Cu_3N$, $Li_3N$, LiPON, and the like.

The energy efficiency of a lithium air battery, as calculated via Equation 1 below as a function of discharge capacity, charge capacity, average charge voltage, and average discharge voltage, is measured after one cycle discharging and charging at a constant current of about 0.05 mA/cm$^2$ at 25° C. at 1 atm to a voltage of about 2 V to about 4.5 V, and may be about 65% or greater. The energy efficiency may be about 70% or greater, and in some embodiments, may be about 75% or greater, and in some other embodiments, may be about 80% or greater, and in some other embodiments, may be about 85% or greater, and in some other embodiments, may be about 90% or greater, and in some other embodiments, may be about 95% or greater.

Energy efficiency (%)=[Average discharge voltage× Discharge capacity]/[Average charge voltage× Charge capacity]×100    Equation 1

The average charge voltage and the average discharge voltage are voltages averaged over a capacity range between about 50 mAh/g and about 300 mAh/g.

The lithium air battery may have a charge/discharge energy efficiency of about 65% or greater without using a redox catalyst for oxygen such as a precious metal, a metal oxide, or the like. Therefore, the lithium air battery may not use a redox catalyst for oxygen or may include a smaller amount of a redox catalyst for oxygen. However, the charge/discharge energy efficiency may be further improved by adding a redox catalyst for oxygen. The charge/discharge energy efficiency of the lithium air battery may be markedly improved because the organic electrolyte participates in the electron transfer during charging and discharging.

An example of manufacturing the lithium air battery is as follows. First, a redox catalyst for oxygen, a conducting agent, and a binder are mixed, and then are added to an appropriate solvent to prepare a positive electrode slurry. The positive electrode slurry is coated and dried on a surface of a current collector, optionally followed by press-molding in order to improve the electrode density, thereby preparing a positive electrode. The redox catalyst for oxygen may be optionally omitted.

Next, a negative electrode is mounted in one side of a case, and the positive electrode with a separator is mounted in another side opposite to the negative electrode, wherein the separator is disposed on the side of the positive electrode facing toward the negative electrode. An electrolyte is injected between the positive electrode and the negative electrode, a porous current electrode is disposed on the positive electrode, and a pressing member that allows air to reach the positive electrode is pushed to fix a cell, thereby completing the manufacture of the lithium air battery. A lithium ion conductive solid electrolyte membrane may be further disposed on one surface of the negative electrode.

The case may be divided into upper and lower parts, which contact the negative and positive electrodes, respectively. An insulating resin may be disposed between the upper and lower parts to electrically insulate the positive and negative electrodes from each other.

The lithium air battery may be either a lithium primary battery or a lithium secondary battery. The lithium air battery may have any of various shapes, and in some embodiments, may have a shape like a coin, a button, a sheet, a stack, a cylinder, a plane, or a horn. The lithium air battery may be used as a large-scale battery for electric vehicles.

FIG. 1 is a schematic view of a lithium air battery 10 according to an embodiment of the present invention. The lithium air battery 10 includes a positive electrode 15 using oxygen as an active material and disposed on a first current collector 14, a negative electrode 13 including lithium and contacting a second current collector 12, an organic electrolyte 18 disposed between the positive electrode 15 and the negative electrode 13, and a separator 16 disposed on one surface of the positive electrode 15. A lithium ion conductive solid electrolyte membrane (not shown) may be disposed on one surface of the negative electrode 13. The first current collector 14, which is porous, may serve as a gas diffusion layer. Although not illustrated, a pressing member allowing air to reach the positive electrode 15 may be further disposed on the first current collector 14.

As used herein, the term "air" is not limited to atmospheric air, and may refer to a combination of gases including oxygen, or pure oxygen gas. This broad definition of "air" also applies to other terms including "air battery" and "air electrode."

Hereinafter, one or more embodiments of the present invention will be described in detail with reference to the following examples. However, these examples are not intended to limit the scope of the one or more embodiments of the present invention.

Preparation of Organic Electrolyte

Preparation Example 1

An organic electrolyte of 1M lithium bis(trifluoromethyl-sulphonyl)amine (LiTFSl, $Li(CF_3SO_2)_2N$) and 5 mM ferrocene ($Fe(C_5H_5)_2$) in propylene carbonate (PC) was prepared.

Preparation Example 2

An organic electrolyte of 1M $Li(CF_3SO_2)_2N$ and 5 mM $[Co(^{+2})(bpy)_3][BF^{4-}]_2$ in propylene carbonate (PC) was prepared. "bpy" indicates a 2,2'-bipyridine ligand.

Preparation Example 3

An organic electrolyte of 1M $Li(CF_3SO_2)_2N$ and 5 mM $V(acac)_3$ in propylene carbonate (PC) was prepared. "acac" indicates an acetylacetonate ligand.

Preparation Example 4

An organic electrolyte of $Li(CF_3SO_2)_2N$ and 5 mM Co-phthalocyanine in propylene carbonate (PC) was prepared.

Preparation Example 5

An organic electrolyte of 1M $Li(CF_3SO_2)_2N$ and 5 mM $[Co(ethylenediamine)_3]Cl_3$ in propylene carbonate (PC) was prepared.

Preparation Example 6

An organic electrolyte of 1M $Li(CF_3SO_2)_2N$ and 5 mM $RhCl_3(PPh3)$ in propylene carbonate (PC) was prepared. "PPh3" indicates a triphenylphosphine ligand.

Preparation Example 7

An organic electrolyte of 1M $Li(CF_3SO_2)_2N$ and 5 mM Pd-porphyrin in propylene carbonate (PC) was prepared.

Preparation Example 8

An organic electrolyte of 1M $Li(CF_3SO_2)_2N$ and 5 mM $Pd(phenanthroline)_2(BF_4)_2$ in propylene carbonate (PC) was prepared.

Preparation Example 9

An organic electrolyte of 1M $Li(CF_3SO_2)_2N$ and 5 mM $Fe(acetate)_2$ in propylene carbonate (PC) was prepared.

Comparative Example 1

An organic electrolyte of Only 1M $Li(CF_3SO_2)_2N$ in propylene carbonate (PC) was prepared.

Manufacture of Lithium Air Battery

Example 1

40 parts by weight of carbon (Super-P), 10 parts by weight of polytetrafluoroethylene (PTFE), and 50 parts by weight of N-methylpyrrolidone (NMP) were mixed to prepare a positive electrode slurry, which was then coated and roll-pressed to prepare a positive electrode sheet. The positive electrode sheet was pressed to adhere to a stainless mesh, and then vacuum dried in a 100° C.-oven for 120 minutes to manufacture a positive electrode. A thin lithium metal foil protected with a 150 μm-thick polymer electrolyte containing a LiTFSl salt and a 150 μm-thick lithium ion conductive glass (Ohara Co., Ltd.) was used as a negative electrode. A polypropylene separator (Celgard-3501) was disposed on the positive electrode.

The lithium negative electrode protected with the lithium ion conductive glass was mounted in a side of a stainless steel case, and the positive electrode with the separator was mounted in the side of the case opposite to the negative electrode. Then, the organic electrolyte of Preparation Example 1 was injected between the positive electrode and the negative electrode, a foamed nickel plate was disposed on the positive electrode, and a pressing member that allows air to reach the positive electrode was pushed to fix a cell, thereby completing the manufacture of a lithium air battery.

An insulating resin was disposed between upper and lower parts of the case, contacting the negative and positive electrodes, respectively, to electrically insulate the positive and negative electrodes from each other.

Example 2

A lithium air battery was manufactured in the same manner as in Example 1, except that the organic electrolyte of Preparation Example 2 was used.

Example 3

A lithium air battery was manufactured in the same manner as in Example 1, except that the organic electrolyte of Preparation Example 3 was used.

Example 4

A lithium air battery was manufactured in the same manner as in Example 1, except that the organic electrolyte of Preparation Example 4 was used.

Example 5

A lithium air battery was manufactured in the same manner as in Example 1, except that the organic electrolyte of Preparation Example 5 was used.

Example 6

A lithium air battery was manufactured in the same manner as in Example 1, except that the organic electrolyte of Preparation Example 6 was used.

Example 7

A lithium air battery was manufactured in the same manner as in Example 1, except that the organic electrolyte of Preparation Example 7 was used.

Example 8

A lithium air battery was manufactured in the same manner as in Example 1, except that the organic electrolyte of Preparation Example 8 was used.

Example 9

A lithium air battery was manufactured in the same manner as in Example 1, except that the organic electrolyte of Preparation Example 9 was used.

Comparative Example 1

A lithium air battery was manufactured in the same manner as in Example 1, except that the organic electrolyte of Comparative Preparation Example 1 was used.

Evaluation Example 1

Evaluation of Charge/Discharge Characteristics

Figure 2:
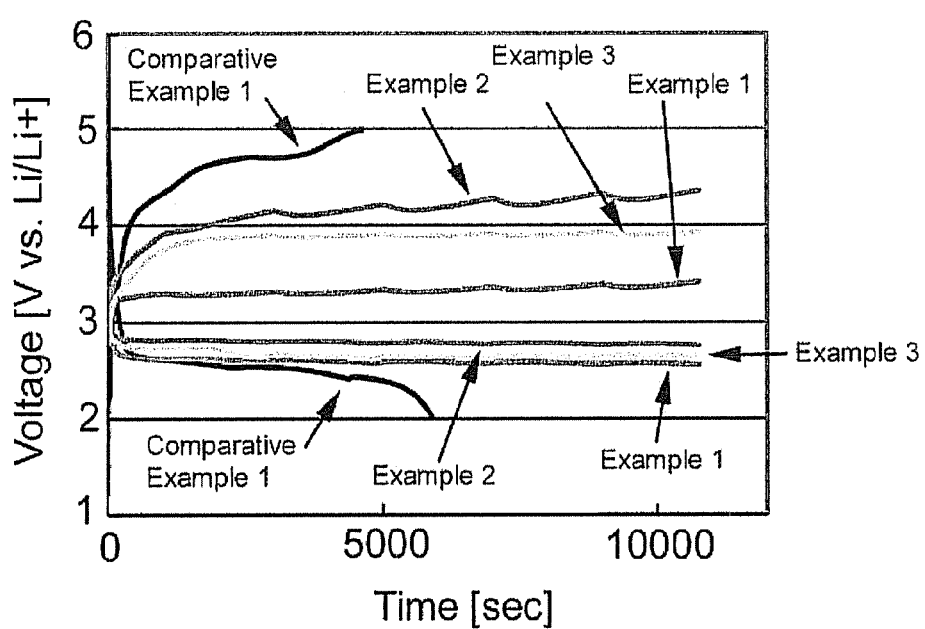
FIG. 2 is a graph of charge-discharge voltage changes with respect to time of lithium air batteries manufactured in Examples 1-3 and Comparative Example 1.

The lithium air batteries manufactured in Examples 1-3 and Comparative Example 3 were discharged at a constant current of 0.05 mA at 25° C. and 1 atm to a voltage of 2 V (with respect to Li metal), and charged at the same current to a voltage of 4.5 V. The charge/discharge test results are shown in Table 1 and FIG. 2. The energy efficiency during charging and discharging is defined as in Equation 1 below and as disclosed above.

$$\text{Energy efficiency (\%)} = [\text{Average discharge voltage} \times \text{Discharge capacity}]/[\text{Average charge voltage} \times \text{Charge capacity}] \times 100 \quad \text{Equation 1}$$

The average charge voltage and the average discharge voltage are voltages averaged over a capacity range between about 50 mAh/g and about 300 mAh/g. A charge-discharge polarization is defined as a difference between a charge voltage and a discharge voltage at 3,000 seconds after charging or discharging begins.

TABLE 1

|  | Charge-discharge polarization (V) | Energy efficiency (%) |
|---|---|---|
| Comparative Example 1 | 2.21 | 53 |
| Example 1 | 0.73 | 78 |
| Example 2 | 1.39 | 67 |
| Example 3 | 1.24 | 68 |

As shown in Table 1, the lithium air batteries of Examples 1-3 have markedly improved energy efficiencies, and decreased charge-discharge overvoltages, compared to the lithium air battery of Comparative Example 1.

As described above, according to one or more of the above embodiments of the present invention, by using an organic electrolyte including a metal-ligand complex, a lithium air battery may have improved energy efficiency and a reduced charge-discharge overvoltage.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium air battery comprising:
   a negative electrode including lithium;
   a positive electrode using oxygen as a positive active material; and
   an organic liquid electrolyte,
   wherein the organic liquid electrolyte comprises a transition metal-ligand complex which is configured to participate in electron transfer during charging and/or discharging,
   wherein the metal-ligand complex has a redox potential of about 2 V to about 5 V with respect to lithium metal,
   wherein the ligand of the metal-ligand complex comprises a haptic ligand, or a polydentate ligand with at least two coordination sites, and
   wherein the metal of the metal-ligand complex is at least one metal selected from the group consisting of vanadium (V), chromium (Cr), manganese (Mn), nickel (Ni), copper (Cu), niobium (Nb), molybdenum (Mo), ruthenium (Ru), tungsten (W), platinum (Pt), silver (Ag), gold (Au), palladium (Pd), and rhodium (Rh).

2. The lithium air battery of claim 1, wherein the ligand of the metal-ligand complex comprises at least one carbon-carbon double bond, or carbon-carbon-triple bond.

3. The lithium air battery of claim 1, wherein the ligand of the metal-ligand complex comprises a conjugated system.

4. The lithium air battery of claim 3, wherein the ligand comprises at least one selected from the group consisting of 1,3-butadiene, 1,3,5-heptatriene, benzene, cyclopentadiene, and cycloheptatriene.

5. The lithium air battery of claim 1, wherein the haptic ligand comprises at least one selected from the group consisting of $\eta^1$-allyl, $\eta^3$-allyl, $\eta^3$-allenyl, $\eta^2$-butadiene, $\eta^4$-butadiene, $\eta^1$-cyclopentadiene, $\eta^3$-cyclopentadiene, $\eta^5$-cyclopentadiene, $\eta^2$-benzene, $\eta^4$-benzene, $\eta^6$-benzene, $\eta^7$-cycloheptatriene, and $\eta^8$-cyclooctatriene.

6. The lithium air battery of claim 1, wherein the polydentate ligand comprises at least one selected from the group consisting of ethylenediamine, 2,2'-bipyridine, 1,10-phenanthroline, acetylacetonate, 1,1-bis(diphenylphosphino)ethane, 1,2-bis(diphenylphosphino)ethane, crown ether, cryptate, diethylenetriamine, dimethyloxime, ethylenediaminetetraacetate, ethylenediaminetriacetate, glycinate, heme, triethylenetetraamine, and terpyridine.

7. The lithium air battery of claim 1, wherein the ligand of the metal-ligand complex comprises a $C_5$-$C_{50}$ aliphatic ring, a $C_2$-$C_{50}$ heteroaliphatic ring, a $C_5$-$C_{50}$ aromatic ring, or a $C_2$-$C_{50}$ heteroaromatic ring.

8. The lithium air battery of claim 1, wherein the ligand of the metal-ligand complex comprises at least one selected from the group consisting of a phthalocyanine ring, a porphyrin ring, a cyclopentadiene ring, an indene ring, a pyridine ring, a carbazole ring, an imidazole ring, a pyrrole ring, a thiophene ring, a thianthrene ring, a furan ring, a pyran ring, an isobenzofuran ring, a pyrazole ring, an isothiazole ring, an isoxazole ring, a pyrazine ring, a pyrimidine ring, a pyridazine ring, a pyrrolizine ring, an indolizine ring, an isoindole ring, an indole ring, an indazole ring, a purine ring, a quinolizine ring, an isoquinoline ring, a quinoline ring, a phthalazine ring, a naphthyridin ring, a quinoxaline ring, a quinazoline ring, a cinnoline ring, a pteridine ring, a phenanthridine ring, an acridine ring, a perimidine ring, a phenanthroline ring, a phenazine ring, a phenothiazine ring, a phenoxazine ring, and derivatives thereof.

9. The lithium air battery of claim 1, wherein the ligand of the metal-ligand complex comprises at least one heteroatom selected from the group consisting of fluorine (F), chlorine (Cl), bromine (Br), iodine (I), silicon (Si), nitrogen (N), oxygen (O), sulfur (S), phosphorus (P), boron (B), selenium (Se), tellurium (Te), and arsenic (As).

10. The lithium air battery of claim 1, wherein the ligand of the metal-ligand complex comprises at least one selected from the group consisting of benzene, cyclopentadiene, acetylacetonate, pyridine, bipyridine, triphenylphosphine, diethylenetriamine, ethylenediamine, ethylenediaminetetraacetate (EDTA), ethylenediaminetriacetate, 1,2-bis(diphenylphosphino)ethane, 1,1-bis(diphenylphosphino)methane, 1,10-phenanthroline, corroles, crown ether, [2,2,2]cryptand, dimethylglyoximate, glycinate, heme, nitrosyl, pyrazine, scorpionate, 2,6-bis(2-pyridyl)pyridine, 1,4,7-triazacyclononane, tricyclohexylphosphine, triethylenetetraamine, trimethylenephosphine, tri(o-tolyl)phosphine, tris(2-aminoethyl)amine, tris(2-diphenylphosphineethyl)amine, tropylium, oxalate, phthalocyanine, porphyrin, $I^-$, $Br^-$, $S^{2-}$, S—$CN^-$, $Cl^-$, $NO_3^-$, $N_3^-$, $F^-$, $OH^-$, $C_2O_4^{2-}$, $H_2O$, N≡C=$S^-$, $CH_3CN$, $NH_3$, $NO_2^-$, $CN^-$, C=O, $SO_3^{2-}$, and derivatives thereof.

11. The lithium air battery of claim 1, wherein the organic liquid electrolyte comprises at least one complex selected from the group consisting of a metallocene complex bearing a transition metal and at least one haptic cyclopentadiene ligand; a phthalocyanine complex bearing a transition metal and a phthalocyanine ligand; a porphyrin complex bearing a transition metal and a porphyrin ligand; an amine complex bearing a transition metal and an amine ligand; a phosphine complex bearing a transition metal and a phosphine ligand; a pyridine complex bearing a transition metal and a pyridine ligand; a phenanthroline complex bearing a transition metal and a phenanthroline ligand; an acetylacetonate complex bearing a transition metal and an acetylacetonate ligand; an acetate complex bearing a transition metal and an acetate ligand, and derivatives of these complexes.

12. The lithium air battery of claim 1, wherein the amount of the metal-ligand complex in the organic liquid electrolyte is from about 0.01 mM to about 5 M.

13. The lithium air battery of claim 1, wherein the organic liquid electrolyte comprises an aprotic solvent.

14. The lithium air battery of claim 1, wherein the organic liquid electrolyte comprises at least one of an alkali metal salt and an alkali earth metal salt.

15. The lithium air battery of claim 1, wherein a cation of the alkali metal salt or alkali earth metal salt comprises at least one selected from the group consisting of lithium ions, sodium ions, magnesium ions, potassium ions, calcium ions, rubidium ions, strontium ions, cesium ions, and barium ions.

16. The lithium air battery of claim 14, wherein the anion of the alkali metal salt or alkali earth metal salt comprises at least one selected from the group consisting of $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (wherein x is a natural number), $(C_xF_{2x+1}SO_2)(C_yF_{2y+1}SO_2)N^-$ (wherein x and y are natural numbers), and halide.

17. The lithium air battery of claim 12, wherein the amount of the alkali metal salt or the alkali earth metal salt in the organic liquid electrolyte is from about 100 mM to about 10 M.

18. The lithium air battery of claim 1, wherein the negative electrode comprises a lithium metal, a lithium metal-based alloy, or a lithium intercalating compound.

19. The lithium air battery of claim 1, wherein the positive electrode comprises a conductive material.

20. The lithium air battery of claim 19, wherein the conductive material comprises a porous carbonaceous material.

21. The lithium air battery of claim 1, wherein the positive electrode further comprises an oxidation/reduction catalyst for oxygen.

22. The lithium air battery of claim 1, further comprising a separator disposed between the positive electrode and the negative electrode.

23. The lithium air battery of claim 1, further comprising a lithium ion conductive solid electrolyte membrane between the negative electrode and the organic liquid electrolyte.

24. The lithium air battery of claim 21, wherein the catalyst is supported on a support selected from the group consisting of an oxide, a zeolite, a clay mineral and carbon.

25. The lithium air battery of claim 1, wherein the positive electrode further comprises a binder.

26. A lithium air battery comprising:
  a negative electrode including lithium;
  a positive electode using oxygen as a positive active material; and
  an organic liquid electrolyte,
  wherein the organic liquid electrolyte comprises a metal-ligand complex which is configured to participate in electron transfer during charging and/or discharging,
  wherein the ligand of the metal-ligand complex comprises at least one selected from the group consisting of an aliphatic chain, an aliphatic ring, a heteroaliphatic chain, a heteroaliphatic ring, an aromatic ring and a heteroaromatic ring,
  wherein the metal-ligand complex has a redox potential or about 2 V to about 5 V with respect to lithium metal,
  wherein the ligand of the metal-ligand complex comprises a haptic ligand, or a polydentate ligand with at least two coordination sites, and
  wherein the metal of the metal-ligand complex is at least one metal selected from the group consisting of vanadium (V), chromium (Cr), manganese (Mn), nickel (Ni), copper (Cu), niobium (N), molybdenum (Mo), ruthenium (Ru), tungsten (W), platinum (Pt), silver (Ag), gold (Au), palladium (Pd), and rhodium (Rh).

* * * * *